United States Patent
Bretschneider et al.

[15] 3,665,012
[45] May 23, 1972

[54] 1-SUBSTITUTED-2-IMINOPYRROLIDINES, INTERMEDIATES THEREFOR AND PROCESSES FOR THE PREPARATION THEREOF

[72] Inventors: Hermann Bretschneider; Wilhelm Klotzer; Rudolf Franzmair, all of Innsbruck, Austria

[73] Assignee: Hoffmann-La Roche Inc., Nutley, N.J.

[22] Filed: Aug. 1, 1969

[21] Appl. No.: 846,916

[30] Foreign Application Priority Data

Aug. 7, 1968    Switzerland ....................... 11,854/68

[52] U.S. Cl. ............. 260/326.3, 260/326.5 S, 260/326.62, 260/326.83, 260/326.85, 260/326.9, 260/454, 260/465.4, 424/274

[51] Int. Cl. ....................................................... C07d 27/04
[58] Field of Search .................... 260/326.3, 326.83, 326.5 S

[56] References Cited

OTHER PUBLICATIONS

Noller, Chemistry of Organic Compounds (1965), pp. 348–349

*Primary Examiner*—Alex Mazel
*Assistant Examiner*—Joseph A. Narcavage
*Attorney*—Samuel L. Welt, Jon S. Saxe, Bernard S. Leon and William G. Isgro

[57]    ABSTRACT

Novel 2-iminopyrrolidines substituted in the 1-position are prepared from 2-amino-$\Delta'$-pyrrolines. The novel pyrrolidines are useful as anti-diabetic and hypoglycemic agents since they effect a lowering of the blood sugar content in warm blooded animals.

13 Claims, No Drawings

1-SUBSTITUTED-2-IMINOPYRROLIDINES, INTERMEDIATES THEREFOR AND PROCESSES FOR THE PREPARATION THEREOF

DESCRIPTION OF THE INVENTION

The present invention relates to novel pyrrolidine compounds. More particularly, it relates to pyrrolidine compounds represented by the formula

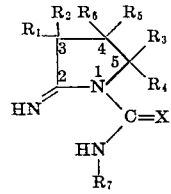

I wherein $R_1$ is phenyl or phenyl substituted with lower alkyl, lower alkoxy or halogen; $R_2$ is lower cycloalkyl, lower cycloalkenyl, phenyl or phenyl substituted with lower alkyl, lower alkoxy or halogen; $R_3$, $R_4$, $R_5$ and $R_6$ are individually hydrogen or lower alkyl; $R_7$ is hydrogen, lower alkyl, lower carbalkoxy-lower alkyl, di-lower alkylamino-lower alkyl, lower alkoxy phenyl, or lower alkoxy-lower alkyl; and X is oxygen or sulfur, and the corresponding pharmaceutically acceptable acid addition salts.

As used herein, the term "lower alkyl" either alone or in combination with another radical denotes straight or branched chain alkyl groups containing from one to seven carbon atoms inclusive, such as methyl, ethyl, propyl, isopropyl, butyl, pentyl, hexyl and the like. The term "lower cycloalkyl" denotes cycloalkyl groups containing from four to seven carbon atoms inclusive in the ring. Preferred lower cycloalkyls are those which contain five or six carbon atoms, such as cyclopentyl and cyclohexyl. The term "lower cycloalkenyl" denotes cycloalkenyl groups containing from four to seven carbon atoms inclusive in the ring. Preferred lower cycloalkenyls are those containing five or six carbon atoms, such as cyclopentenyl and cyclohexenyl. The term "lower alkoxy" denotes alkoxy groups containing from one to seven carbon atoms, for example methoxy, ethoxy or propoxy. Typical suitable lower alkoxy-lower alkyl groups are methoxy-methyl, methoxy-ethyl and the like. A typical suitable lower alkyl substituted phenyl group is, for example, tolyl. Typical suitable lower alkoxy substituted phenyl groups are, for example, p-methoxy phenyl, p-ethoxy phenyl and the like. Typical suitable lower carbalkoxy-lower alkyl groups are, for example, carbethoxy methyl, carbethoxy ethyl, carbethoxy propyl and the like. Typical suitable di-lower alkylamino-lower alkyl groups are, for example, dimethylamino and diethylamino-ethyl, -propyl, -butyl and the like. The term "halogen" as used herein denotes all four halogens, i.e., chlorine, fluorine, bromine, and iodine. A typical suitable halogen substituted phenyl group is, for example, p-chlorophenyl.

A preferred group of compounds falling within the scope of Formula I are those wherein $R_1$ and $R_2$ each represent a phenyl group, $R_3$ and $R_4$ each represent hydrogen or lower alkyl groups, preferably methyl or ethyl, $R_5$ and $R_6$ are hydrogen, and $R_7$ is hydrogen, lower alkyl, lower alkoxy-lower alkyl, or lower carbalkoxy-lower alkyl. The compounds falling within the scope of this preferred group may be represented by the following formula

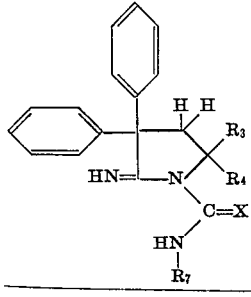

I-a wherein $R_3$ and $R_4$ are hydrogen or lower alkyl, preferably methyl or ethyl, X is oxygen or sulfur, and $R_7$ is hydrogen, lower alkyl, lower alkoxy-lower alkyl, or lower carbalkoxy-lower alkyl, and the corresponding pharmaceutically acceptable acid addition salts.

The compounds of Formula I and I-a above as well as the pharmaceutically acceptable acid addition salts thereof may be prepared by a variety of methods. Following one such method, a compound represented by Formula I is prepared by reacting a 2-amino-Δ'-pyrroline compound of the formula

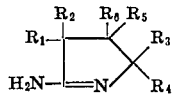

II wherein $R_1$–$R_6$ are as described above or by reacting an H-tautomer of a compound represented by Formula II with a compound containing the

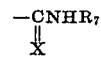

group, wherein X and $R_7$ are as described above.

The H-tautomers of the 2-amino-Δ'-pyrrolines of Formula II above can be structurally identified as 2-imino-pyrrolidines represented by the following formula

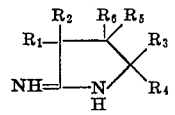

II-a wherein $R_1$–$R_6$ are as described above.
Examples of compounds containing the

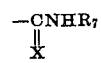

group are: isothiocyanates, such as lower alkyl isothiocyanates, for example, n-butyl isothiocyanate, lower alkoxy-lower alkyl isothiocyanates, for example, methoxy-methyl isothiocyanate, and lower carbalkoxy-lower alkyl isothiocyanates, for example, carbethoxymethyl isothiocyanate; or isocyanates, such as lower alkyl isocyanates, for example, n-butyl-isocyanate.

The reactions between compounds represented by Formulas II and II-a and the compounds containing the

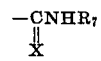

group is conducted at room temperature, e.g., about 20° C. to about 25° C., or if necessary, at a temperature below room temperature. The reaction is carried out in an inert organic solvent such as an aromatic hydrocarbon, for example, benzene, toluene or xylene; and aliphatic hydrocarbon, for example, petroleum ether; an aliphatic alcohol, for example, methanol or ethanol; a chlorinated hydrocarbon, for example chloroform; or an ether, for example, dioxane or tetrahydrofuran. The reaction may also be conducted using dimethylformamide or acetonitrile as the inert solvent.

The compounds represented by Formula II, used as the starting material for the above described process, may be prepared from $R_1$, $R_2$-disubstituted acetonitriles. The appropriately substituted acetonitrile is reacted with an N-carbalkoxy ethyleneimine (which may be lower alkyl or di-lower alkyl substituted) in the presence of a basic condensation agent such as sodamide. The 2carbalkoxy-amino-Δ'-pyrroline thus obtained is then heated with aqueous alcoholic alkali to obtain the desired 2-amino-Δ'-pyrroline.

Alternatively, the compounds represented by Formula II may be obtained by the conversion of a Mannich base (prepared by the reaction between a malonic ester of the formula $R_3CH(COO-$ lower alkyl$)_2$, formaldehyde and dimethylamine) into the iodomethylate. The thus obtained iodomethylate is then condensed with an $R_1$, $R_2$-disubstituted acetonitrile in the presence of sodium ethylate. Saponification of the condensation product with alkali hydroxide gives a carboxylic acid which is transformed into the acid chloride with thionyl chloride. The acid chloride is subjected to Curtis degradation to yield an isocyanate represented by the formula

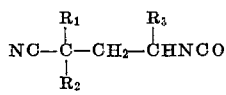

which can be saponified to the amine in methanol with alkali hydroxide.

Following a second possible method of preparing compounds represented by Formulas I and I-a, a compound represented by the formula

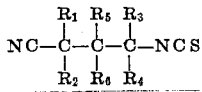
III wherein $R_1$–$R_6$ are as described above is reacted with an amine represented by the formula $$R_7—NH_2 \qquad IV$$

wherein $R_7$ is as described above, to yield the desired 2-iminopyrrolidines.

The reaction between compounds represented by Formulas III and IV is carried out at room temperature e.g., about 20° C. to about 25° C., or if necessary, below room temperature. The reaction is carried out in an inert organic solvent such as an aromatic hydrocarbon, for example, benzene, toluene or xylene; an aliphatic hydrocarbon, for example, petroleum ether; an aliphatic alcohol, for example, methanol or ethanol; a chlorinated hydrocarbon, for example, chloroform; or an ether, for example, dioxane or tetrahydrofuran. The reaction may also be conducted using dimethylformamide or acetonitrile as the inert solvent.

The compounds represented by Formula III can be obtained by treating compounds represented by Formula II with thiophosgene. Alternatively, a correspondingly substituted 3-cyanopropyl isocyanate (prepared as described above in the preparation of compounds represented by Formula II) can be reacted with phosphorus pentasulphide to yield a compound represented by Formula III.

In still another possible method of preparing compounds represented by Formulas I and I-a, a compound represented by the formula

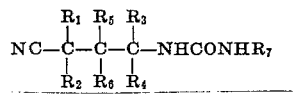
V wherein $R_1$–$R_7$ are as described above is treated with an appropriate base to yield the desired 2-imino-pyrrolidines. This cyclization reaction is conducted at room temperature, e.g., about 20° C. to about 25° C. For the purposes of the reaction, the base employed to effect the cyclization of compounds represented by Formula V is selected from the group consisting of alkali metal alcoholates, such as, for example, sodium or potassium methylate or ethylate; or alcoholic caustic potash. The compounds represented by formula V may be prepared by the reaction of a correspondingly substituted 3-cyanopropyl isocyanate with a compound represented by Formula IV.

In yet another possible method of preparing compounds represented by Formulas I and I-a, a compound represented by Formula II is reacted with a cyanogen halide, preferably cyanogen bromide, at room temperature e.g., about 20° C. to about 25° C., or, if necessary, below room temperature. The reaction is carried out in the presence of a hydrogen halide binding agent, for example, an alkali hydroxide or carbonate. Two isomeric reaction products can form as a result of this reaction, depending in each case on whether the cyano group is added to the ring N-atom ($N_1$) or to the amino group in the 2-position ($N_2$). The isomers may be separated on the basis of their differing solubility in dilute hydrochloric acid, since only the $N_1$-isomer is soluble in the acid. The $N_1$-cyano derivative, which is represented by the formula

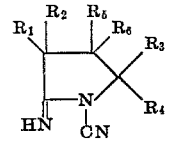
VI wherein $R_1$–$R_6$ are as described above can be hydrated to the ureido compounds represented by Formula I (X = O) by treatment with an appropriate acid, preferably alcoholic or aqueous hydrochloric acid. The $N_1$-cyano derivatives represented by Formula VI may also be converted into the thioureido compounds represented by Formula I (X = S) by treatment with hydrogen sulphide or a thiophosphoric acid ester such as a thiophosphoric acid 0,0-dialkyl ester.

The compounds represented by Formula I exhibit a high level of hypoglycemic activity, evidencing their usefulness as anti-diabetics. The hypoglycemic activity of the compounds represented by Formula I is shown in warm blooded animals utilizing a standard blood glucose content test. In this test, groups of five rats weighing from about 60 to 80 g are used. Oral application of a suspension of the compound in polyethylene glycol (Carbowax 400) is performed by stomach tube. Control rats are given the vehicle alone. At intervals of 1, 3 and 16 hours after administration of the compound, blood is obtained from the test animals by decapitation and the blood is immediately deproteinized [Somogyi, M. *J. Biol. Chem.*, 160, 69–73 (1945)]. Glucose content in the blood is determined by the Technican Auto-Analyzer using the enzymatic glucose oxidase-peroxidase-tolidine procedure [Watson, D., *Anal. Biochem.*, 3, 131 (1962)]. The results from five rats are averaged at each time interval and are reported as percent deviation from control. Results are expressed as percent deviation in the blood glucose value from the control pretreatment value.

The readings are averaged by groups. Percent deviations from controls are calculated by the following formula: Percent Deviation from controls =

100 × (1,3 or 16 hour mg percent average − Control mg percent average)/Control mg percent average If the 1,3 or 16 hour average is greater than the control, the result is a positive percentage. If the control average is higher, the result is a negative percentage. The significance of the results is calculated by a computer program. Results are expressed as percent deviation from control [numerical value preceded by (+) or (−)].

Following the test procedure discussed above, the compounds of Formula I are shown to possess hypoglycemic activity which makes them useful as anti-diabetic agents. Following this standard test procedure, compounds such as those listed below show deviations evidencing hypoglycemic activity at the indicated dosage levels:

The compound 1-(N-methoxymethyl)-thiocarbamoyl-2-imino-3,3-diphenyl-5-methylpyrrolidine when administered at the rate of 353 mg/kg gave 0, −10, and −21 per cent when tested as above.

The compound 1-(N-n-butylthiocarbamoyl)-2-imino-3,3-diphenyl-5-methylpyrrolidine when administered at a rate of 366 mg/kg gave − 7,−12, and −17 per cent when tested as above.

The compound 1-(N-3'-dimethylaminopropyl)-thiocarbamoyl-2-imino-3.3-diphenylpyrrolidine when administered at a rate of 118 mg/kg gave +2, −5, and −23 per cent when tested as above.

The compound 1-(N-n-butylcarbamoyl)-2-imino-3,3-diphenyl-5-methylpyrrolidine when administered at a rate of 350 mg/kg gave +5, −1, and −17 per cent when tested as above.

The compounds represented by Formula I may be incorporated into pharmaceutical formulations according to conventional technniques so that the drug will be present in the formulation in an amount from about 100 to about 600 mg, preferably in an amount from about 300 to about 600 mg, compounded into conventional pharmaceutical dosage forms which contain the active ingredients or their pharmaceutically acceptable salts in admixture with a pharmaceutically suitable organic or inorganic inert carrier material. Representative of such inert carrier materials are water, gelatin, lactose, starches, magnesium stearate, talc, etc. The pharmaceutical dosage formulations can be compounded as tablets, dragees, capsules and the like. They may also contain other therapeutically pharmacologically active substances.

The following examples are illustrative but not limitative of the invention. Temperatures, unless otherwise stated, are expressed in degrees Centigrade.

EXAMPLE 1

0.01 mol of 2-amino-3,3-diphenyl-5-methyl-$\Delta^1$-pyrroline are dissolved in 20 ml of ethanol at room temperature. The solution is treated with 0.01 mol of methoxymethyl isothiocyanate and allowed to stand for 4 hours. The precipitate is filtered off, washed with a little cold ethanol and dried. 1-(N-methoxymethyl)-thiocarbamoyl-2-imino-3,3-diphenyl-5-methyl-pyrrolidine, melting point 101° C., is obtained.

EXAMPLE 2

In a similar fashion as disclosed in Example 1, the following compounds may be prepared from the indicated starting materials:

From 2-amino-3,3-diphenyl-$\Delta^1$-pyrroline there is obtained 1-(N-methoxymethyl)-thiocarbamoyl-2-imino-3,3-diphenyl-pyrrolidine, melting point 121° C.

From 2-amino-3,3-diphenyl-5-methyl-$\Delta^1$-pyrroline and carbethoxymethyl isothiocyanate there is obtained 1-(N-carbethoxymethyl)-thiocarbamoyl-2-imino-3,3-diphenyl-5-methylpyrrolidine, melting point 140° C.

From 2-amino-3,3-diphenyl-5-methyl-$\Delta^1$-pyrroline and n-butyl isothiocyanate there is obtained 1-(N-n-butyl)-thiocarbamoyl-2-imino-3,3-diphenyl-5-methylpyrrolidine, melting point 105° C.

From 2-amino-3,3-diphenyl-5-methyl-$\Delta^1$-pyrroline and dimethylaminopropyl isothiocyanate there is obtained 1-(N-3'-dimethylaminopropyl)-thiocarbamoyl-2-imino-3,3-diphenyl-5-methylpyrrolidine, melting point 130° C.

From 2-amino-3,3-diphenyl-$\Delta^1$-pyrroline and dimethylaminopropyl isothiocyanate there is obtained 1-(N-3'-dimethylaminopropyl)-thiocarbamoyl-2-imino-3,3-diphenyl-pyrrolidine of melting point 83°–84° C.

EXAMPLE 3

0.01 mol of 2-amino-3,3-diphenyl-5-methyl-$\Delta^1$-pyrroline are suspended in 20 ml of cold absolute benzene. 0.991 g of n-butyl isocyanate are thereafter added. The reaction mixture is shaken up to solution and allowed to stand at room temperature for 1 hour. The benzene is then taken off in vacuum at 25° C. bath-temperature and the oily residue treated with a mixture of 10 ml of ethanol, 10 ml of water and 2 ml of 10 percent acetic acid. Crystalline 1-(N-n-butylcarbamoyl)-2-imino-3,3-diphenyl-5-methylpyrrolidine, melting point 80°–82° C. (from aqueous methanol) is obtained.

EXAMPLE 4

In a similar fashion as disclosed in Example 3, from 2-amino-3,3-diphenyl-$\Delta^1$-pyrroline there is obtained 1-(N-n-butylcarbamoyl)-2-imino-3,3-diphenylpyrroline, melting point 74° C. (from petroleum ether).

EXAMPLE 5

0.73 g of n-butylamine are slowly added to 2.76 g of 2,2-diphenyl-4-isocyanatovaleronitrile in 20 ml of benzene. The reaction mixture is allowed to stand at room temperature for 1 hour and then the solvent is removed in vacuum. The oily residue (3.26 g) is triturated with a little ether, whereby N-n-butyl-N'-(1-methyl-3,3-diphenyl-3-cyanopropyl)-urea crystallizes, melting point 89°–91° C. (from ethanol/water).

EXAMPLE 6

3 drops of 1.3 mol sodium methylate solution are added to 0.5 g of N-n-butyl-(1-methyl-3,3-diphenyl-3-cyanopropyl)-urea in 10 ml of methanol. The reaction mixture is allowed to stand at room temperature for 60 hours, thereafter diluted with 5 ml of water and cooled to 0° C., whereby 1-(N-n-butylcarbamoyl)-2-imino-3,3-diphenyl-5-methylpyrrolidine crystallizes.

EXAMPLE 7

To 5 g of 2-amino-3,3-diphenyl-5-methyl-$\Delta^1$-pyrroline in 120 ml of benzene there are added dropwise, with ice-cooling, 1.15 g of thiophosgene dissolved in 25 ml of benzene. The reaction mixture is stirred at room temperature for 4 hours, the precipitate separated off and the solution shaken 10 minutes with 100 ml of 5 percent sodium bicarbonate solution. The organic phase is washed with water and dried over sodium sulphate. After evaporation of the solvent, the residue is distilled at 0.01 torr and 190° C. bath-temperature. The distillate, 2,2-diphenyl-4-isothiocyanatovalonitrile, crystallizes on trituration with methanol, melting point 93° C. (from methanol).

EXAMPLE 8

1.2–1.3 equivalents of n-butylamine are added to 0.5 g of 2,2-diphenyl-4-isothiocyanatovaleronitrile in 15 ml of ethanol. The reaction mixture is allowed to stand at room temperature for 3 hours and then concentrated under reduced pressure. The residue is triturated with a little ethanol and yields 0.52 g of crystalline 1-(N-n-butylthiocarbamoyl)-2-imino-3,3-diphenyl-5-methylpyrrolidine.

EXAMPLE 9

A solution of 16 g of 2-amino-3,3-diphenyl-5-methyl-$\Delta^1$-pyrroline in 130 ml of chloroform is treated with a solution of 10 g of anhydrous potassium carbonate in 50 ml of water. The solution is vigorously stirred at 10°–15° C. for 3 ½ hours with a solution of 10 g of cyanogen bromide in 60 ml of chloroform. After an additional 4 hours, the chloroform phase is separated off and repeatedly shaken out with half-concentrated hydrochloric acid. The hydrochloric acid extracts are alkalized, with cooling, with potassium carbonate solution, yielding 1-cyano-2-imino-3,3-diphenyl-5-methylpyrrolidine, melting point 145° C.

EXAMPLE 10

1.3 g of 1-cyano-2-imino-3,3-diphenyl-5-methylpyrrolidine are suspended in 30 ml of absolute ether and treated dropwise with stirring at 0° C. with a solution of 0.89 g of dithiophosphoric acid 0,0-diethyl ester in 5 ml of ether. The reaction mixture is stirred at 0° C. for an hour, thereafter saturated with dry hydrogen chloride forming a clear solution. The solvent is evaporated off under vacuum and the residue dissolved in 70 ml of water. The aqueous solution is washed with ether cooled and made alkaline with 2-N NaOH, yielding 1-thiocarbamoyl-2-imino-3,3-diphenyl-5-methylpyrrolidine, melting point 130° C. (from ethanol).

We claim:
1. A compound of the formula

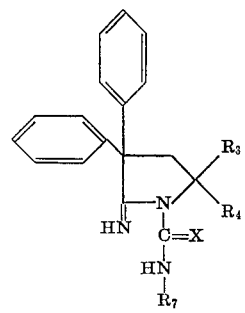

wherein X is oxygen or sulfur; $R_3$ and $R_4$ are individually hydrogen or lower alkyl and $R_7$ is hydrogen, lower alkyl, carbalkoxy-lower alkyl, di-lower alkylamino-lower alkyl, lower alkoxy-phenyl, or lower alkoxy-lower alkyl and the pharmaceutically acceptable acid addition salts thereof.

2. A compound selected from the group of compounds represented by the formula

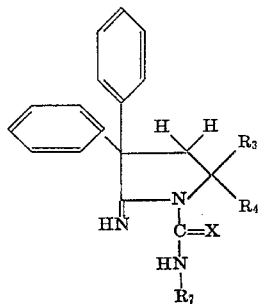

wherein $R_3$ and $R_4$ are hydrogen or lower alkyl, X is oxygen or sulfur, and $R_7$ is hydrogen, lower alkyl, lower alkoxy-lower-alkyl, lower carbalkoxy-lower alkyl, and pharmaceutically acceptable acid addition salts thereof.

3. A compound of claim 2 wherein X is sulfur.

4. A compound of claim 3 wherein $R_3$ is hydrogen, $R_4$ is methyl, and $R_7$ is methoxy-methyl, i.e. 1-(N-methoxymethyl)-thiocarbamoyl-2-imino-3,3-diphenyl-5-methypyrrolidine.

5. A compound of claim 3 wherein $R_3$ and $R_4$ are hydrogen and $R_7$ is methoxy-methyl, i.e. 1-(N-methoxymethyl)-thiocarbamoyl-2-imino-3,3-diphenyl-pyrrolidine.

6. A compound of claim 3 wherein $R_3$ is hydrogen, $R_4$ is methyl, and $R_7$ is carbethoxymethyl, i.e. 1-(N-carbethoxymethyl)-thiocarbamoyl-2-imino-3,3-diphenyl-5-methylpyrrolidine.

7. A compound of claim 3 wherein $R_3$ is hydrogen, $R_4$ is methyl, and $R_7$ is butyl, i.e. 1-(N-n-butyl)-thiocarbamoyl-2-imino-3,3-diphenyl-5-methylpyrrolidine.

8. A compound of claim 3 wherein $R_3$ is hydrogen, $R_4$ is methyl, and $R_7$ is dimethylaminopropyl, i.e. 1-(N-3'-dimethylaminopropyl)-thiocarbamoyl-2-imino-3,3-diphenyl-5-methylpyrrolidine.

9. A compound of claim 3 wherein $R_3$ and $R_4$ are hydrogen and $R_7$ is dimethylaminopropyl, i.e. 1-(N-3'-dimethylaminopropyl)-thiocarbamoyl-2-imino-3,3-diphenylpyrrolidine.

10. A compound of claim 3 wherein $R_3$ is hydrogen, $R_4$ is methyl and $R_7$ is hydrogen, i.e. 1-thiocarbamoyl-2-imino-3,3-diphenyl-5-methylpyrrolidine.

11. A compound of claim 2 wherein X is oxygen.

12. A compound of claim 11 wherein $R_3$ is hydrogen, $R_4$ is methyl, and $R_7$ is butyl, i.e. 1-(N-n-butyl-carbamoyl)-2-imino-3,3-diphenyl-5-methylpyrrolidine.

13. A compound of claim 11 wherein $R_3$ and $R_4$ are hydrogen and $R_7$ is butyl, i.e. 1-(N-n-butyl-carbamoyl)-2-imino-3,3-diphenylpyrrolidine.

* * * * *